Figure 3:
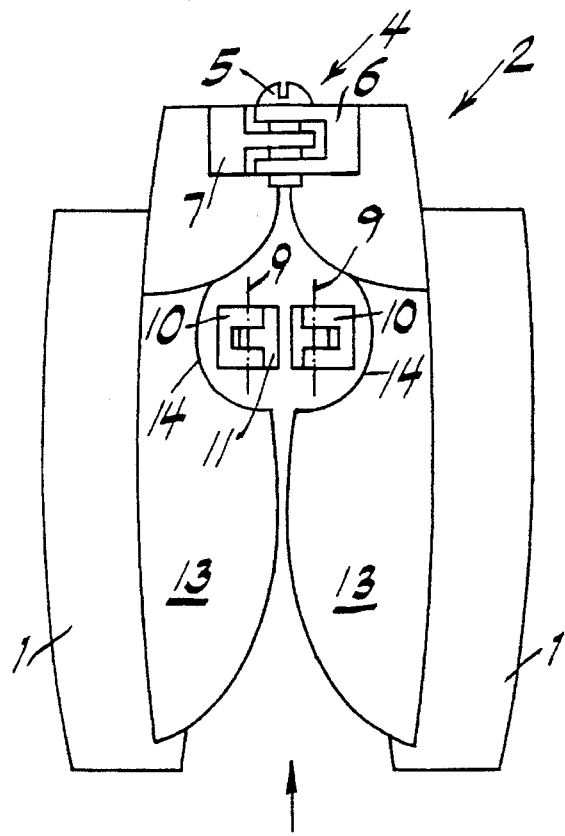

United States Patent [19]

Scheller

[11] Patent Number: 5,576,776

[45] Date of Patent: Nov. 19, 1996

[54] FOLDING EYEGLASSES

[76] Inventor: Hansruedi Scheller, Moorschwand, 8815 Horgenberg, Switzerland

[21] Appl. No.: 385,360

[22] Filed: Feb. 8, 1995

[30] Foreign Application Priority Data

Feb. 15, 1994 [CH] Switzerland ............... 454/94

[51] Int. Cl.$^6$ ............... G02C 5/08; A61F 9/02
[52] U.S. Cl. ............... 351/63; 2/454
[58] Field of Search ............ 351/63, 101, 102, 351/104, 119, 121, 124, 129, 140, 153; 2/454

[56] References Cited

U.S. PATENT DOCUMENTS 4,747,680  5/1988  Hatano et al. ............... 351/153
4,834,523  5/1989  Porsche ............... 351/63

*Primary Examiner*—William L. Sikes
*Assistant Examiner*—Huy Mai
*Attorney, Agent, or Firm*—Shenier & O'Connor

[57] ABSTRACT

The reading glasses are foldable, the hinge (4) having only a single joint axis (5). The optical part (1) of the eyeglasses is in one piece with the nosepiece (2) and consists of a synthetic material. I.e., frameless eyeglasses whose foldable earpieces (9–11) consist of a metal are obtained. The hinge (4–7) consists of a metal and lies embedded in the nosepiece (2). The latter is provided with recesses (14) in which the folded earpieces (9–11) lie. The eyeglasses can be produced inexpensively and may be folded up with small dimensions.

10 Claims, 2 Drawing Sheets

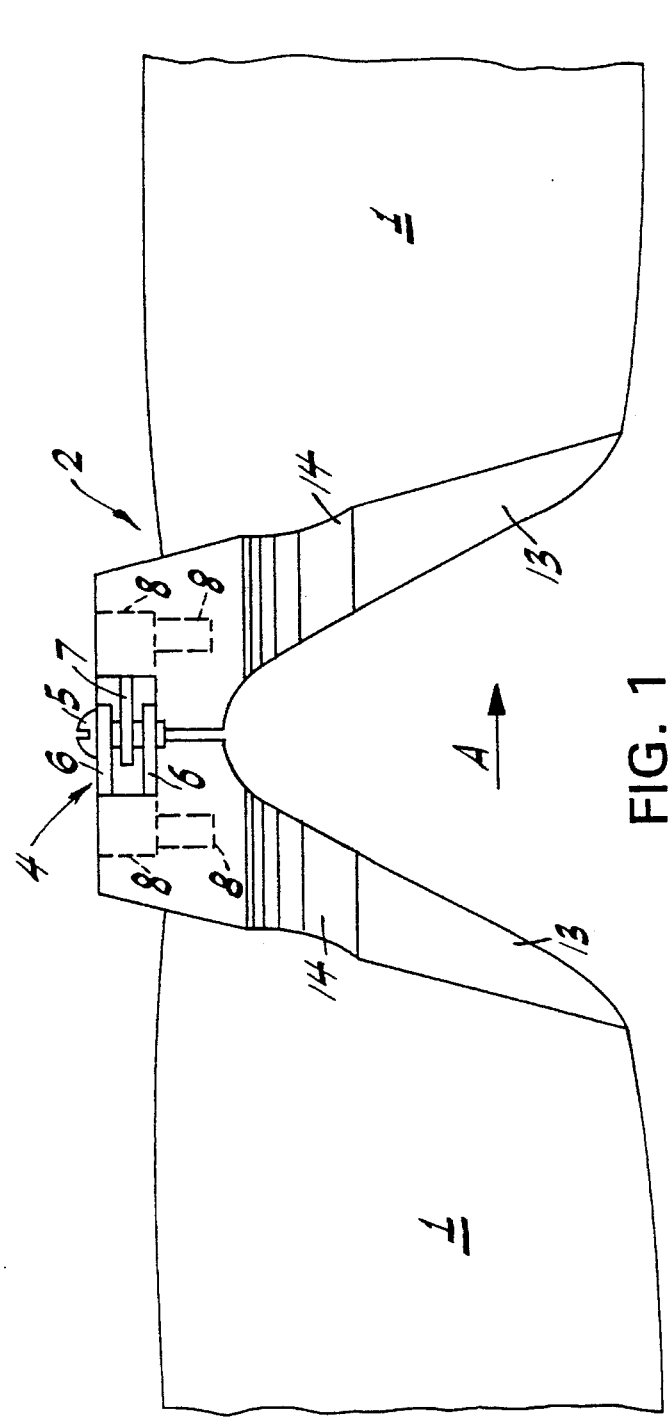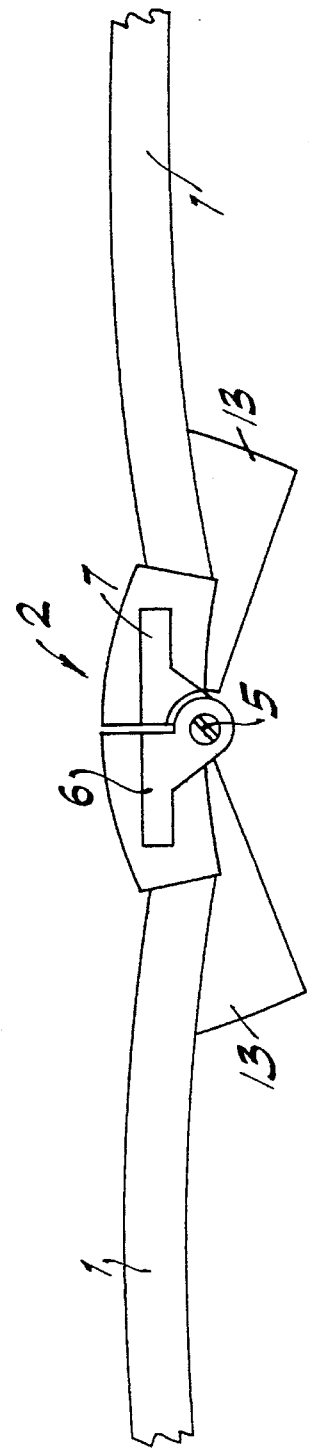

FOLDING EYEGLASSES

The invention concerns eyeglasses having an optical part and a non-optical part which comprise the earpiece and the nosepiece, where the nosepiece is of a synthetic material in one piece with the optical part.

Such eyeglasses are known as reading glasses, in which the optical part (the lenses) consist of a synthetic material and a frame separate therefrom is not present. Such eyeglasses can be produced inexpensively. The object is to make such eyeglasses foldable. There are already eyeglasses which can be folded, where the frame of the glasses (spectacle frame) has a hinge at its nosepiece, which is designed as a double joint and thus has two joint axes which lie parallel side by side at a considerable distance apart. This is necessary for the eyeglasses to be able to fold at all, i.e., for the middle joint of each folded earpiece to come to lie between the two joint axes of the hinge of the nosepiece. Such foldable eyeglasses are still relatively thick, and the doubled joint of the hinge also results in considerable costs.

The object of the invention is to procure eyeglasses in which the abovementioned disadvantages can be avoided.

The eyeglasses according to the invention are characterized in that the nosepiece is provided with a hinge, consisting of a metal, that lies embedded in the synthetic material of the nosepiece, and in that each earpiece is capable of folding by means of a middle joint, all for folding the eyeglasses.

Figure 4:
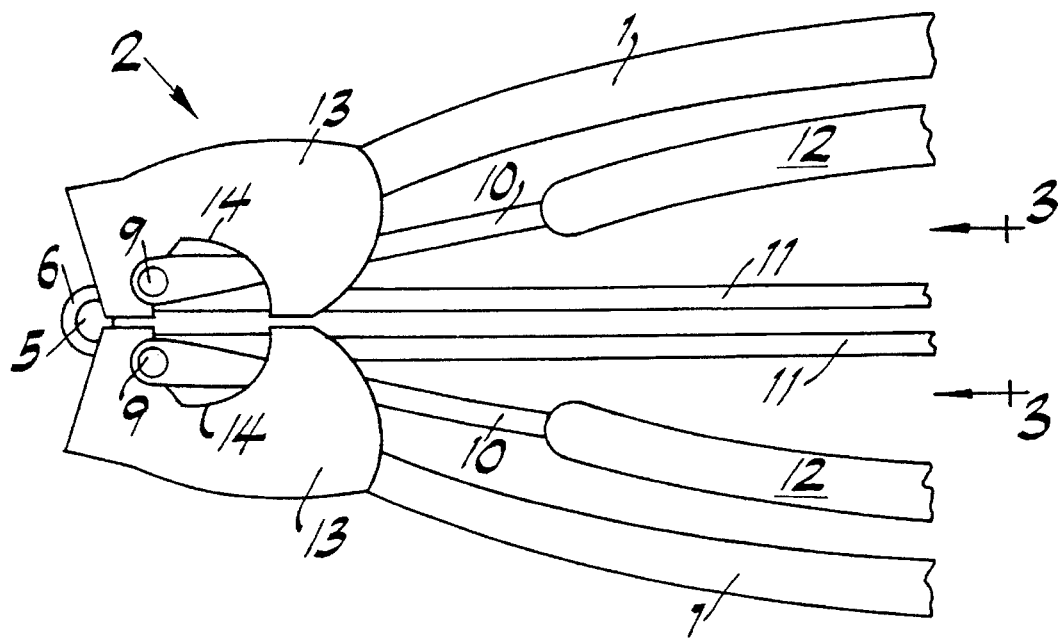

An example of the subject matter of the invention is represented in the drawing, wherein;

FIG. 1 shows a part of the eyeglasses, seen from the inner side of the eyeglasses, enlarged, FIG. 2, a top view of the eyeglass part of FIG. 1, FIG. 3, the folded eyeglasses in a view in the direction of the arrow A in FIG. 1, and FIG. 4, the folded eyeglasses in a view in the direction of the arrow B in FIG. 3.

The optical part of the eyeglasses consists of the two so-called glasses (even if they are made of a synthetic material) or lenses 1. The non-optical part of the eyeglasses comprises the nosepiece 2 and the two earpieces 3. The optical part 1 and the nosepiece 2 are in one piece and consist of a synthetic material. The nosepiece is provided with a hinge 4, consisting of a metal, which is embedded in the synthetic material. The hinge 4 has only a single joint axis, which in the example illustrated is formed by a screw 5. In FIG. 1 the two hinge parts 6 and 7, joined together articulated by means of the screw 5, extend over the line 8, and show that this part of the hinge, embedded in the synthetic material of the nosepiece, represents a metal reinforcement of the synthetic material.

Each earpiece 3 is foldable by means of a middle joint 9 and thus comprises two earpiece parts 10 and 11, the earpiece part 10 worn on the ear usually being provided with a casing 12 of synthetic material.

The nosepiece 2 has two ribs 13, each rib 13 being provided with a recess 14 lying on the inner side of the eyeglasses. When the eyeglasses are folded, the two recesses 14 combine to form an almost circular recess, in which the folded earpieces 3 lie, as can be seen in FIGS. 3 and 4. So that the folded earpieces 3, with their two parts 10 and 11 and their joint 9, will fit easily into these two recesses 14, the said parts 9 to 11 consist of metal and may therefore be sized small.

The eyeglasses represented, i.e., wherein the optical part 1 and the nosepiece 3 are in one piece and consist of a synthetic material, will usually be used as so-called reading glasses, which can be produced very inexpensively. Also contributing to this is the fact that the hinge lying in the nosepiece has only a single joint axis. Owing to the two recesses 14, the folded eyeglasses have a thickness, which can be seen in FIG. 3, that is smaller than in known foldable eyeglasses, this said thickness extending as width from left to right in FIG. 3.

The hinge of the nosepiece 2, consisting of the parts 5–8, has the further advantage that, after opening of the only one screw 5, the eyeglasses are divided into two halves so that, for example, a new pair of eyeglasses can be assembled from two different optical parts 1, either because the eyes are different, or because one eyeglass part is broken or an optical part is scratched. The folded eyeglasses of FIG. 3 are also relatively sturdy, since when pressure is exerted from left to right in FIG. 3 the parts 9–11 are able to rest on one another and also on the wall of the recesses, while simultaneously the two nosepiece ribs 13 likewise rest on one another and, in addition, support via the parts 5–8 of the hinge 4 is present so that dimensionally stable eyeglasses are obtained in the folded state thanks to the mutual support of these components.

I claim:

1. Folding eyeglasses including in combination a pair of members each having a lens and a half-nosepiece and a half-bridge, means disposed on the half-bridges for affording rotation of the members relative to one another about a vertical axis, a pair of temples, means mounting the temples on the respective members remote the half-bridges for rotation about a vertical axis, each temple having an intermediate hinge dividing the temple into a front part and a rear part rotatable relative to one another about a vertical axis, wherein each rear part may be rotated inwardly to contact its corresponding front part, each lens having a rear surface, each half-bridge and corresponding half-nosepiece extending rearwardly of said rear surface and being provided with a horizontally extending recess therebetween, wherein each contacting front and rear part may be rotated into a corresponding recess and the two members may be folded until the half-nosepieces are in proximity to one another, in the folded position of the members the two recesses forming an aperture and the intermediate hinges extending into said aperture.

2. Eyeglasses as in claim 1 wherein the intermediate hinges extend through the aperture in the folded position of the members.

3. Eyeglasses as in claim 1 wherein the members are formed of plastic.

4. Eyeglasses as in claim 1 wherein the temples and their intermediate hinges are formed of metal.

5. Eyeglasses as in claim 1 wherein each temple rear part is provided with a plastic portion adapted to contact a wearer's ear.

6. Eyeglasses as in claim 1 wherein the means disposed on the half-bridges comprises a metal hinge.

7. Eyeglasses as in claim 6 wherein the metal hinge has portions imbedded in each half-bridge.

8. Eyeglasses as in claim 1 wherein the means mounting the temples on the members comprise metal hinges.

9. Eyeglasses as in claim 1 wherein the lenses have powers usually associated with reading glasses.

10. Eyeglasses as in claim 1 which are formed as half-eyes wherein the half-bridges project above the lenses.

* * * * *